United States Patent [19]

Hirano et al.

[11] Patent Number: 5,114,383
[45] Date of Patent: May 19, 1992

[54] APPARATUS FOR CONTROLLING CONTINUOUS VARIABLE TRANSMISSION

[75] Inventors: Sadayuki Hirano; Yoshinori Yamashita, both of Shizuoka; Takumi Tatsumi; Hiroaki Yamamoto, both of Hyogo, all of Japan

[73] Assignees: Suzuki Jidosha Kogyo Kabushiki Kaisha; Mitsubishi Denki Kabushiki Kaisha, Tokyo, Japan

[21] Appl. No.: 714,218

[22] Filed: Jun. 12, 1991

Related U.S. Application Data

[63] Continuation of Ser. No. 588,595, Sep. 26, 1990, abandoned.

[30] Foreign Application Priority Data

Sep. 30, 1989 [JP] Japan .................. 1-256338

[51] Int. Cl.$^5$ .......................................... F16H 63/00
[52] U.S. Cl. .................................. 474/18; 74/866
[58] Field of Search ............... 474/8, 11, 12, 17, 18, 474/69, 28, 70; 74/865–867

[56] References Cited

U.S. PATENT DOCUMENTS

| 4,653,006 | 3/1987 | Osanai et al. | 474/18 X |
| 4,658,360 | 4/1987 | Osanai et al. | 474/18 X |
| 4,764,155 | 8/1988 | Kumura et al. | 474/12 |
| 4,853,858 | 8/1989 | Kumura | 474/18 X |
| 4,926,716 | 5/1990 | Hirano et al. | 74/866 |
| 5,025,686 | 6/1991 | Sato et al. | 474/18 X |

FOREIGN PATENT DOCUMENTS

| 57-186656 | 11/1982 | Japan . |
| 59-43249 | 3/1984 | Japan . |
| 59-77159 | 5/1984 | Japan . |
| 61-233256 | 10/1986 | Japan . |
| 64-44346 | 2/1989 | Japan . |

Primary Examiner—Thuy M. Bui
Attorney, Agent, or Firm—Flynn, Thiel, Boutell & Tanis

[57] ABSTRACT

An apparatus for controlling a continuously variable vehicle transmission includes a fixed pulley member and a movable pulley member which is supported for movement toward and away from the fixed pulley member. A groove defined between the pulley members has a width which is decreased and increased to thereby respectively increase and decrease the rotational radius of a belt which is received in the groove. A control arrangement executes speed change control to change the belt ratio. The control arrangement includes a control unit which receives throttle opening degree and vehicle velocity detection signals and determines first and second target engine rotational speed which are based respectively on these detection signals. The control unit determines an optimum target engine rotational speed based on the firt and second target engine rotational speeds and sets upper and lower limit values of the optimum target engine rotational speed in accordance with predetermined conditions. The control unit processes the optimum target engine rotational speed to obtain a final target engine rotational speed which is used to control the transmission.

9 Claims, 7 Drawing Sheets

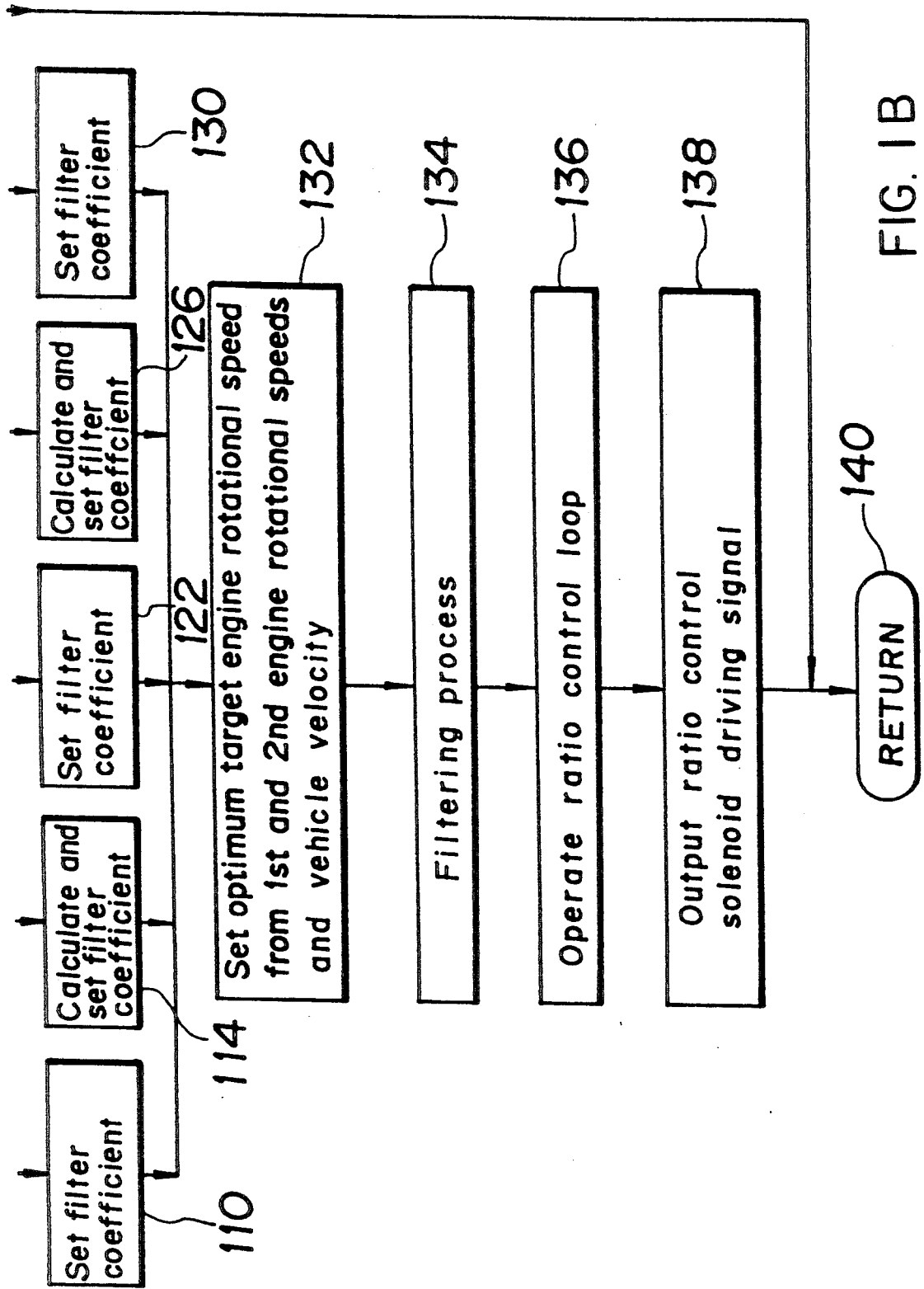

APPARATUS FOR CONTROLLING CONTINUOUS VARIABLE TRANSMISSION

This application is a continuation of U.S. Ser. No. 07/588,595, filed Sep. 26, 1990, now abandoned.

FIELD OF THE INVENTION

The present invention relates to an apparatus for controlling a continuous variable transmission and, more particularly, to a continuous variable transmission control apparatus in which operating characteristics according to a vehicle velocity detection signal are obtained, and a response speed is changed when a target engine rotational speed is set, thereby enabling operating characteristics which are desired by the driver to be obtained.

BACKGROUND OF THE INVENTION

In vehicles, a transmission is arranged between the internal combustion engine and driving wheels. According to the transmission, the driving force of the driving wheels and the running velocity are changed in accordance with the running conditions of the vehicle which change in a wide range, thereby making the performance of the internal combustion engine sufficiently effective. In a known continuous variable transmission in which a pulley has a fixed pulley member fixed to a rotary shaft and a movable pulley member attached to the rotary shaft so as to be movable toward and away from the fixed pulley member, and the width of a groove formed between the pulley members is increased and decreased to thereby respectively decrease and increase the rotational radius of a belt which is reeved to the pulley, whereby motive power is transferred, and the belt ratio is changed. Such a continuous variable transmission has been disclosed in, for instance, JP-A-57-186656, JP-A-59-43249, JP-A-59-77159, and JP-A-61-233256.

The applicant of the present invention has already developed a method of controlling a continuous variable transmission, in which a throttle opening degree detection signal, a vehicle velocity detection signal, and a rotational speed limiting command at a shift position are input to a control unit, an optimum target engine rotational speed is determined, and a speed change control is performed (JP-A-64-44346).

In the conventional control apparatus, when a target value of the speed change control is set, upper and lower limit values are set on the basis of the throttle opening degree, vehicle velocity, shift position such as D, L₁, L₂, a power mode option signal, or the like. However, there are inconveniences in that the vehicle running state which is desired by the driver, for instance, a running state adapted to a mountain road, a city street, a highway, a downtown road, or the like cannot be set and it is impossible to assure various characteristics such as economical performance of the vehicle, silence, acceleration response speed, engine braking effect, and the like.

In the known transmission control system, since the running state is selected on the basis of only the detection signal of the shift position, there are inconveniences such that speed change characteristics which satisfy the driver cannot be obtained and, further, it is necessary to widely set a degree of selection.

It is therefore an object of the present invention to provide a continuous variable transmission control apparatus including a control unit for receiving a throttle opening degree detection signal and a vehicle velocity detection signal, for determining an optimum target engine rotational speed from a first target engine rotational speed based on the throttle opening degree detection signal and from a second target engine rotational speed based on the vehicle velocity detection signal, for setting upper and lower limit values for the optimum target engine rotational speed in accordance with predetermined conditions, for obtaining a final target engine rotational speed, and for executing a speed change control so as to assure that desired operating characteristics are adapted to the vehicle state. The desired operating characteristics can be assured by the predetermined conditions and the operating performance, and characteristics such as economical performance, accelerating performance, engine braking effect, or the like can be freely selected.

To accomplish the above object, according to the invention, in an apparatus for controlling a continuous variable transmission including a fixed pulley member and a movable pulley member attached to the fixed pulley member so as to be movable toward and away from the fixed pulley member, the width of a groove between both of the pulley members is decreased and increased to thereby respectively increase and decrease the rotational radius of a belt which is reeved between both of the pulley members, and speed change control is executed so as to change the belt ratio. A control unit is provided for receiving throttle opening degree and vehicle velocity detection signals, for determining an optimum target engine rotational speed from a first target engine rotational speed based on the throttle opening degree detection signal and from a second target engine rotational speed based on the vehicle velocity detection signal, for setting upper and lower limit values of the optimum target engine rotational speed in accordance with predetermined conditions, for obtaining a final target engine rotational speed, and for executing speed change control so as to assure desired operating characteristics adapted to the vehicle running state.

When the vehicle is driven, the throttle opening degree and vehicle velocity detection signals are input to the control unit to thereby decide the optimum target engine rotational speed. The upper and lower limit values of the optimum target engine rotational speed are set in accordance with predetermined conditions, and the final target engine rotational speed is obtained.

BRIEF DESCRIPTION OF THE DRAWINGS

Embodiments of the present invention will be described in detail hereinbelow on the basis of the drawings, in which:

FIG. 1A–1B are flowcharts for showing how a first embodiment of the invention controls engine rotation or a belt drive type continuous variable transmission;

DETAILED DESCRIPTION

Figure 5:
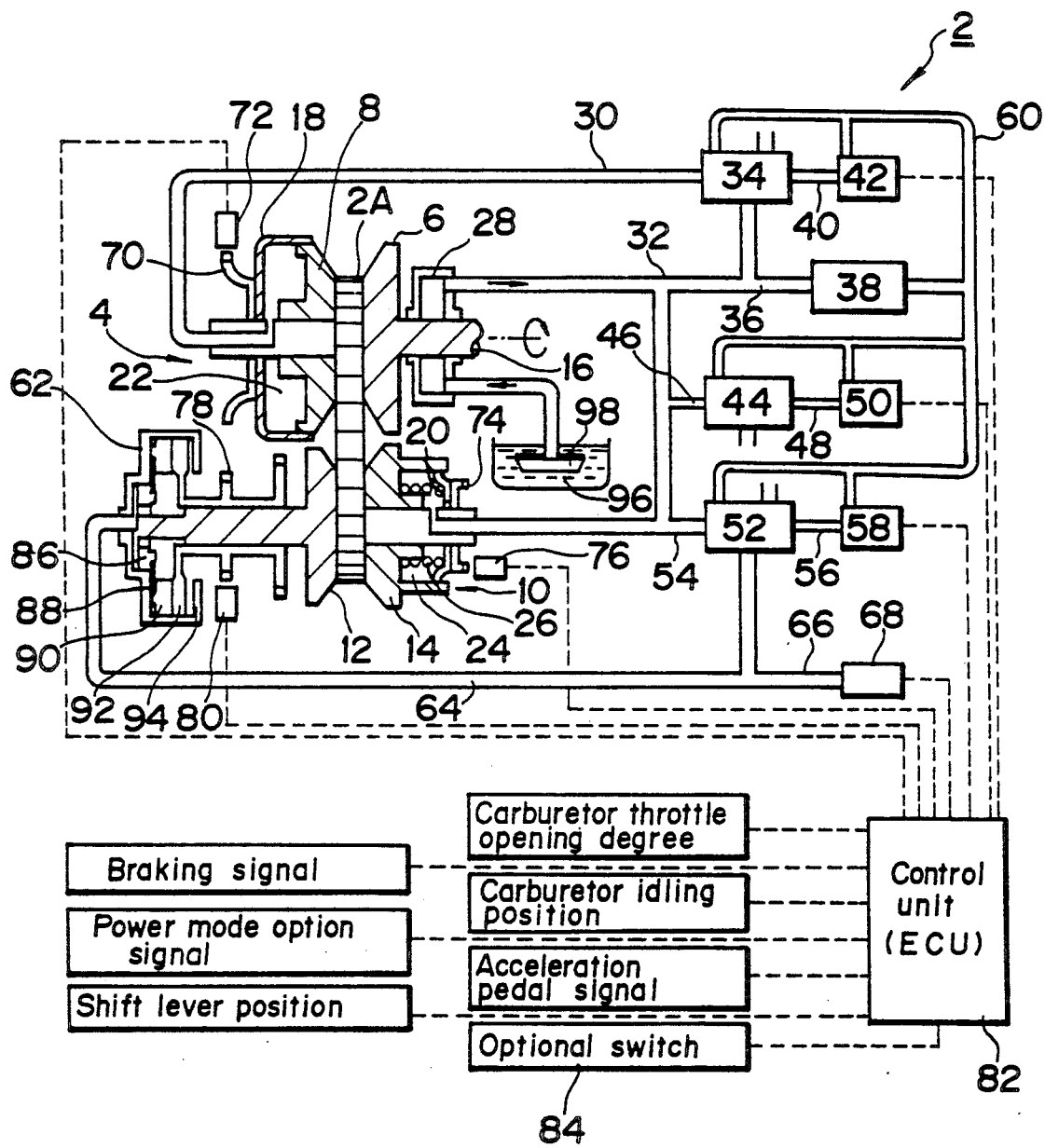
FIG. 5 is a block diagram of the belt drive type continuous variable transmission of the present invention.

FIGS. 1 to 5 show the first embodiment of the invention. In FIG. 5, reference numeral 2 denotes a belt drive type continuous variable transmission; 2A indicates a belt; 4 a driving side pulley having a driving side fixed pulley member 6 and a driving side movable pulley member 8; 10 a driven side pulley having a driven side fixed pulley member 12 and a driven side movable pulley member 14. The driving side fixed pulley member 6 is fixed to a rotary shaft 16; and the driving side movable pulley member 8 is attached to the rotary shaft 16 so as to be movable in the axial direction of the rotary shaft 16 and rotatable relative thereto. The driven side pulley 10 also has the driven side fixed pulley member 12 and the driven side movable pulley member 14 arranged in a manner similar to the driving side pulley 4.

First and second housings 18 and 20 are attached to the driving side movable pulley member 8 and the driven side movable pulley member 14, respectively, so that first and second hydraulic chambers 22 and 24 are formed, respectively. A pressing means 26 made of a spring or the like for pressing the second housing 20 in a direction so as to enlarge the second hydraulic chamber 24 is arranged in the second hydraulic chamber 24.

An oil pump 28 is provided for the rotary shaft 16. The oil pump 28 is communicated with the first and second hydraulic chambers 22 and 24 by first and second oil passages 30 and 32, respectively. A primary pressure control valve 34 serving as a speed change control valve to control a primary pressure as an input shaft sheave pressure is arranged in the first oil passage 30. A constant pressure control valve 38 to control a line pressure (generally, 5 to 25 kg/cm$^2$) to a predetermined pressure (3 to 4 kg/cm$^2$) communicates with the first oil passage 30 between the oil pump 28 and the primary pressure control valve 34 by a third oil passage 36. A first three-way electromagnetic valve 42 to control the primary pressure communicates with the primary pressure control valve 34 by a fourth oil passage 40.

A line pressure control valve 44 having a relief valve function for controlling a line pressure as a pump pressure communicates with the second oil passage 32 by a fifth oil passage 46. A second three-way electromagnetic valve 50 to control the line pressure communicates with the line pressure control valve 44 by a sixth oil passage 48.

Further, a clutch pressure control valve 52 to control a clutch pressure communicates by a seventh oil passage 54 with the second oil passage 32 between the second hydraulic chamber 24 and the line pressure control valve 44. A third direction electromagnetic valve 58 to control the clutch pressure communicates with the clutch pressure control valve 52 by an eighth oil passage 56.

The primary pressure control valve 34, first electromagnetic valve 42, constant pressure control valve 38, second electromagnetic valve 50, line pressure control valve 44, clutch pressure control valve 52, and third electromagnetic valve 58 communicate through a ninth oil passage 60.

The clutch pressure control valve 52 communicates with a hydraulic vehicle start clutch 62 by a tenth oil passage 64. A pressure sensor 68 communicates with the tenth oil passage 64 by an eleventh oil passage 66. The pressure sensor 68 can directly detect oil pressure when the clutch pressure is in the holding mode, starting mode, or the like, and is controlled so as to contribute to the setting of the detected clutch oil pressure to a target clutch pressure. On the other hand, in the driving mode, since the clutch pressure is equal to the line pressure, the pressure sensor 68 also contributes to line pressure control.

An input shaft rotation detecting gear 70 is arranged on the outside of the first housing 18. A first rotation detector 72 on the input shaft side is arranged near the outer peripheral portion of the input shaft rotation detecting gear 70. On the other hand, an output shaft rotation detecting gear 74 is arranged on the outside of the second housing 20. A second rotation detector 76 on the output shaft side is arranged near the outer peripheral portion of the output shaft rotation detecting gear 74. The detection signals of the first and second rotation detectors 72 and 76 are output to a control unit 82, which will be explained hereinlater, thereby obtaining the engine rotational speed and the belt ratio.

An output transferring gear 78 is attached to the hydraulic vehicle start clutch 62. A third rotation detector 80 to detect the rotation of a final output shaft is arranged near the outer peripheral portion of the gear 78. That is, the third rotation detector 80 detects the rotation of the final output shaft which is directly coupled to a reduction gear, a differential device, a driving shaft, and tires, and can therefore detect the vehicle velocity. On the other hand, the input and output rotational speeds of the hydraulic vehicle start clutch 62 can be detected by the second and third rotation detectors 76 and 80, and those detectors contribute to the detection of a clutch slip amount.

Further, there is provided the control unit 82 for receiving various conditions such as throttle opening degree of the carburetor (not shown) of the vehicle, engine rotational speed, vehicle velocity, and the like from the first to third rotation detectors 72, 76, and 80 and for changing a duty ratio, thereby executing a speed change control. The control unit 82 controls the opening and closing operations of the first three-way electromagnetic valve 42 to control the primary pressure, second three-way electromagnetic valve 50 to control the line pressure, and third three-way electromagnetic valve 58 to control the clutch pressure, and the control unit also controls the pressure sensor 68.

The control unit 82 may be implemented using a conventional microprocessor circuit, as will be evident from the following description. Various signals which are input to the control unit 82 and the functions of the input signals will now be described in detail.

1) Detection signal of the shift lever position:

The line pressure, belt ratio, and clutch pressure which are required for each range of the transmission are controlled by the range signals P, R, N, D, $L_1$, $L_2$, and the like.

2) Detection signal of the carburetor throttle opening degree:

Based on this signal, the control unit determines engine torque from a memory in which data has previously been input, and the target belt ratio or a target engine rotational speed is determined.

3) Detection signal of the carburetor idling position:

The carburetor throttle opening degree sensor is corrected and the accuracy in control is improved.

4) Acceleration pedal signal:

The will of the driver is detected by the amount of depressing of the acceleration pedal, and the appropriate control upon running or starting of the vehicle is decided.

5) Braking signal:

The presence or absence of the depressing operation of the braking pedal is detected and the appropriate control for the disconnection of the clutch or the like is determined.

6) Power mode option signal:

This signal is used as an option to set the performance of the vehicle into a sporty (high performance) mode or an economical mode.

The control unit 82 has a construction such that the throttle opening degree detection signal and the vehicle velocity detection signal are input, and an optimum target engine rotational speed is determined from a first target engine rotational speed based on the throttle opening degree detection signal and from a second target engine rotational speed based on the vehicle velocity detection signal. Upper and lower limit values of the optimum target engine rotational speed are set in accordance with predetermined conditions, a final target engine rotational speed is obtained, and speed change control is performed to assure that vehicle operating characteristics are adapted to the running state.

An optional switch 84 (FIGS. 2 and 5) is arranged near, for instance, the driver's seat. The upper and lower limit values of the optimum target engine rotational speed are set by the detection signal of the shift lever position and an ON/OFF signal which the control unit 82 receives from the optional switch 84.

Reference numeral 86 denotes a piston of the hydraulic vehicle start clutch 62; 88 indicates a ring-shaped spring; 90 a first pressure plate; 92 a friction plate; 94 a second pressure plate; 96 an oil pan; and 98 an oil filter.

The operation will now be described.

As shown in FIG. 5, the belt drive type continuous variable transmission 2 is constructed in a manner such that the oil pump 28 on the rotary shaft 16 operates in response to the driving of the rotary shaft 16 and the oil is drawn from the oil pan 96 in the bottom portion of the transmission up through the oil filter 98. The line pressure as a pump pressure is controlled by the line pressure control valve 44. If a large quantity of oil is permitted to escape through the line pressure control valve 44 back to a reservoir (not shown), then the line pressure decreases. As the amount of escaping oil decreases, the line pressure increases.

The electronic control of the belt drive type continuous variable transmission 2 will now be described.

The continuous variable transmission 2 is hydraulically controlled. A proper line pressure to hold the belt and to transfer the torque, a primary pressure to change the belt ratio, and a clutch pressure to positively engage the clutch are respectively assured for the continuous variable transmission 2 in accordance with commands from the control unit 82.

Figure 1A:
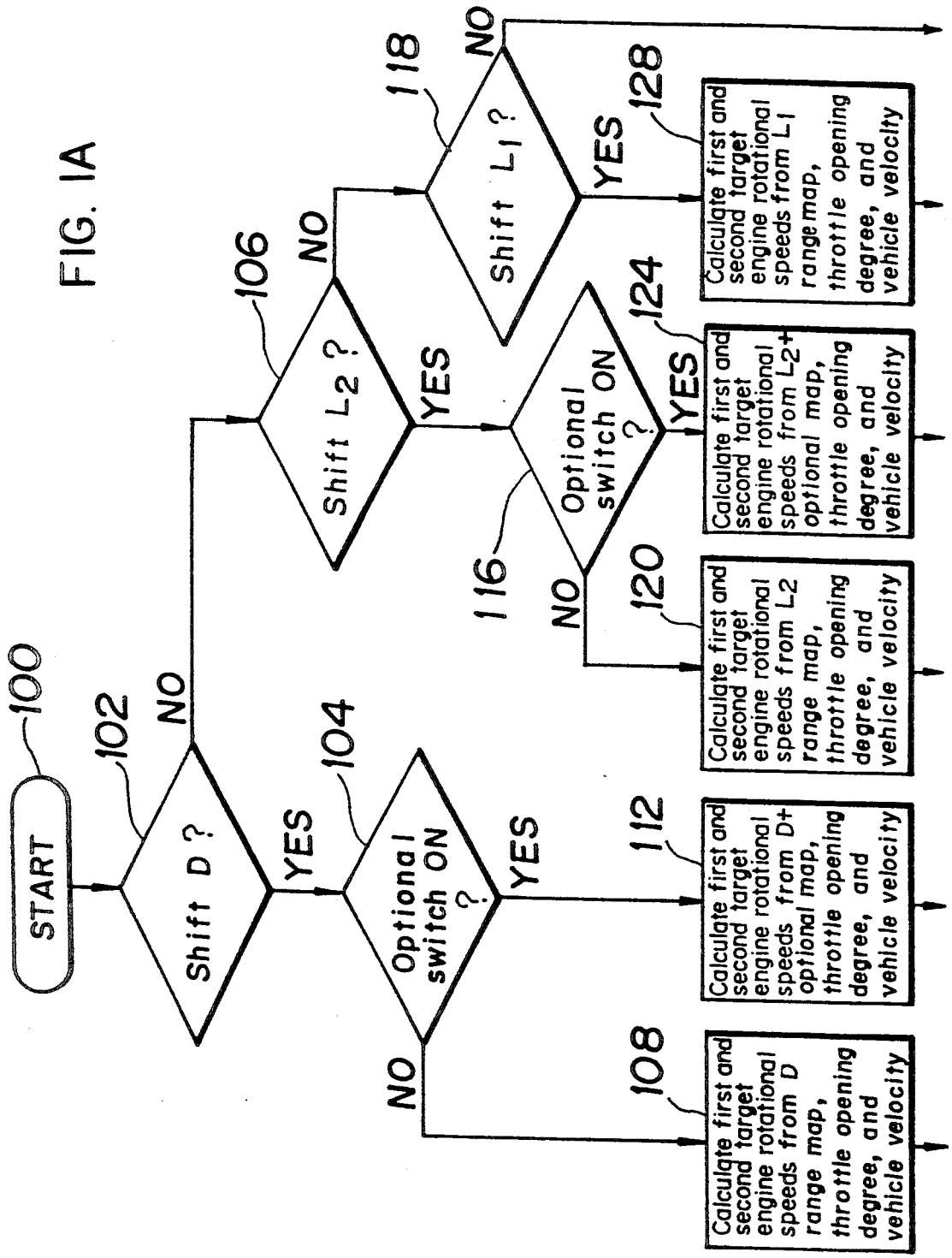

Referring to the flowchart of FIG. 1, the engine rotation control of the belt drive type continuous variable transmission 2 is started at 100 by the actuation of the internal combustion engine (not shown). A check is made at 102 to see if the shift position has been set to D or not.

If YES in the discrimination 102, the processing routine advances to a discrimination step 104 to see if the optional switch 84 has been turned on or not. If NO in step 102, the processing routine advances to a discrimination step 106 to see if the shift position has been set to $L_2$ or not.

If NO in the discrimination 104, the first and second target engine rotational speeds are calculated at 108. The first target speed is calculated from a first table 200D (FIG. 2) as a D range map and the throttle opening degree. The second target speed is calculated from a second table 202D as a D range map and the vehicle velocity. A filter coefficient is set at 110. On the other hand, if the discrimination 104 is YES, the first and second target engine rotational speeds are calculated at 112. The first target speed is calculated from tables $200L_2$ and 200D, a predetermined proportional distribution ratio by the optional switch 84 which acts on the first table 200D, and the throttle opening degree. The second target speed is calculated from the second tables 202D and $202L_2$, a predetermined proportional distribution ratio by the optional switch 84 which acts on the two maps, and the vehicle velocity. A filter coefficient is set at 114. As a method of calculating the first and second target engine rotational speeds at 112 and at 124, which will be explained hereinlater, respective maps of D and $L_2$ are used in the case of the D range and respective maps of $L_2$ and $L_1$ are used in the case of the $L_2$ range and they are set on the basis of each predetermined distribution ratio. In addition, there is also considered a method whereby the shift position and an optional map are used.

If the discrimination 106 to see if the shift position has been set to $L_2$ is YES, the processing routine advances to a discrimination step 116 to see if the optional switch 84 has been turned on. If NO in step 106, the processing routine advances to a discrimination step 118 to see if the shift position has been set to $L_1$.

If the discrimination 116 to see if the optional switch 84 has been turned on is NO, the first and second target engine rotational speeds are calculated at 120. The first target speed is calculated from a first table $200L_2$ as an $L_2$ range map and the throttle opening degree. The second target speed is calculated from a second table $202L_2$ as an $L_2$ range map and the vehicle velocity. A filter coefficient is set at 122. On the other hand, if the discrimination 116 is YES, the first and second target engine rotational speeds are calculated at 124. The first target speed is calculated from the first tables $200L_2$ and $200L_1$, a predetermined proportional distribution ratio by the optional switch 84 which acts on the first tables $200L_2$ and $200L_1$, and the throttle opening degree. The second target speed is calculated from the vehicle velocity, the second tables $202L_2$ and $202L_1$, and a predetermined proportional distribution ratio by the optional switch which acts on the two tables. A filter coefficient is set at 126.

On the other hand, if the discrimination 106 to see if the shift position has been set to $L_2$ is NO, a check is made at 118 to see if the shift position has been set to $L_1$.

If the discrimination 118 is YES, the first and second target engine rotational speeds are calculated at 128. The first target speed is calculated from a first table $200L_1$ as an $L_1$ range map, and the throttle opening degree. The second target speed is calculated from a second table $202L_1$ as an $L_1$ range map and the vehicle velocity. A filter coefficient is set at 130.

After the filter coefficients are set at one of steps 110, 114, 122, 126, and 130, the optimum target engine rotational speed is set at 132 on the basis of the first and second engine rotational speeds and the vehicle velocity. A filtering process 134 is executed to provide a primary delay which changes in accordance with each setting state, and the final target engine rotational speed is thereby obtained. After that, a ratio control loop operating process 136 is executed. A signal to drive a ratio control solenoid is output at 138. The engine rotation of the belt drive type continuous variable transmission 2 is thereby controlled as desired, and the control process ends at 140.

On the other hand, if the discrimination 118 to see if the shift position has been set to $L_1$ is NO, the program ends (140).

Figure 2:
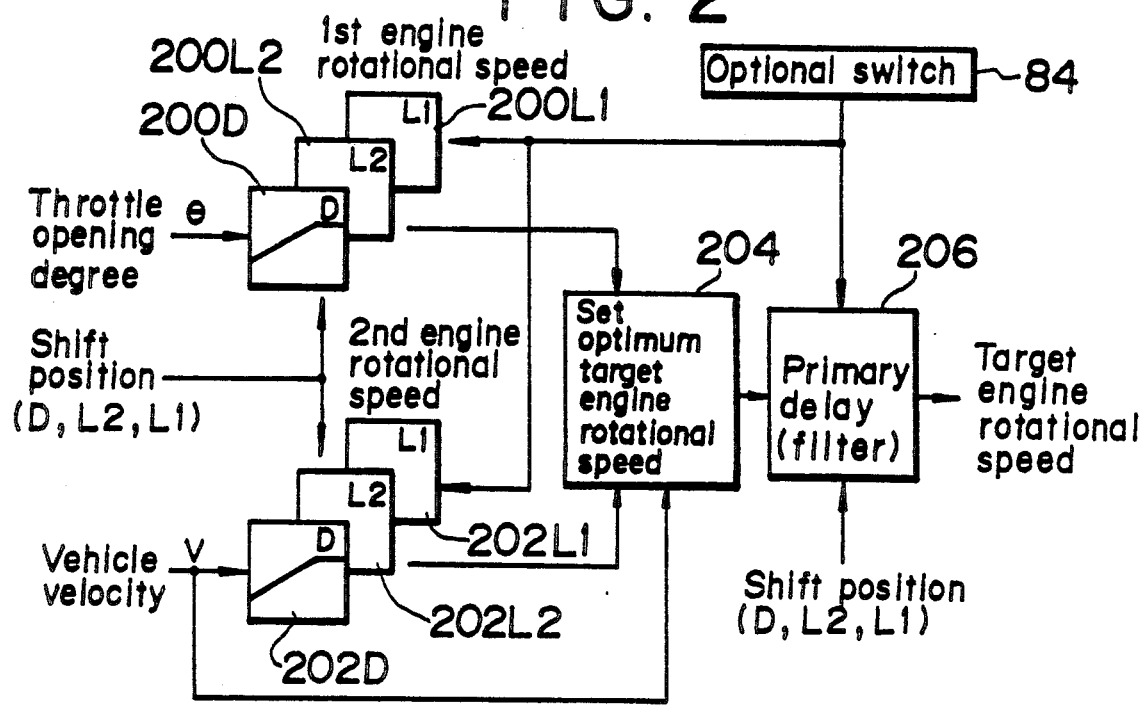
FIG. 2 is a diagram for explaining how the first embodiment achieves engine rotation control of the belt drive type continuous variable transmission.

The engine rotation control of the belt drive type continuous variable transmission 2 will now be described with reference to FIG. 2.

Figure 3:
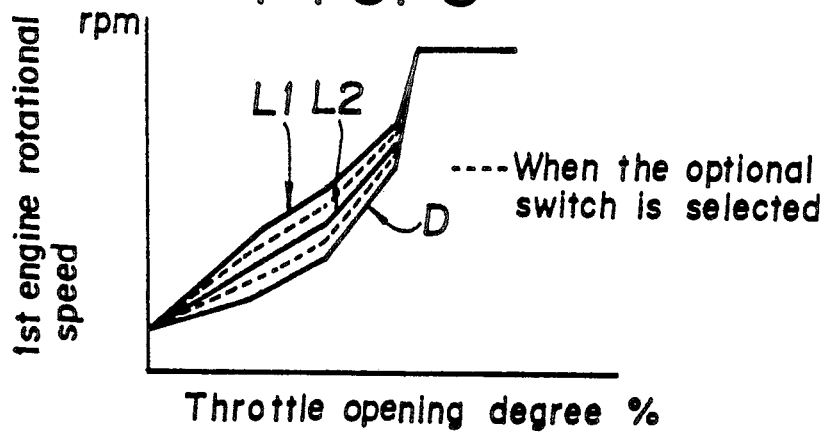
FIG. 3 is a diagram showing the relation between a first engine rotational speed and the throttle opening degree in the first embodiment.
Figure 4:
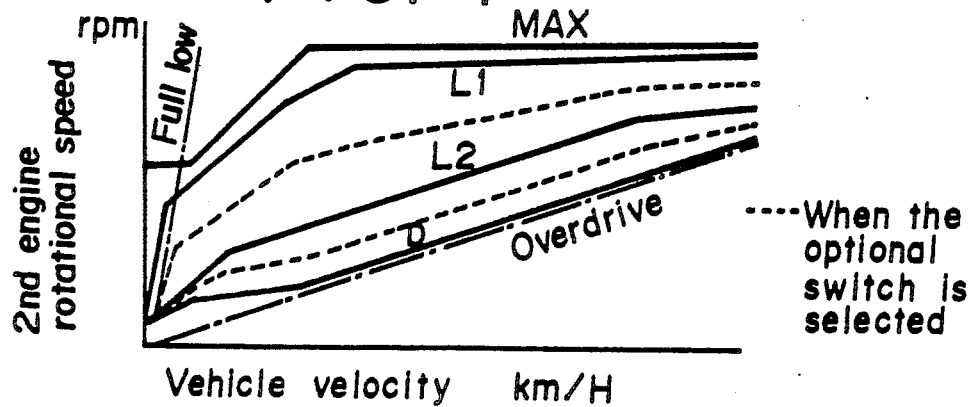
FIG. 4 is a diagram showing the relation between a second engine rotational speed and the vehicle velocity in the first embodiment.

First, a first target engine rotational speed is obtained from the first tables 200D, $200L_2$, and $200L_1$ according to the selected shift position (D, $L_2$, or $L_1$) and the detection signal representing the throttle opening degree ($\theta$) of the carburetor (see FIG. 3). A second target engine rotational speed is obtained from second tables 202D, $202L_2$, and $202L_1$ according to the shift position (D, $L_2$, or $L_1$) and the vehicle velocity detection signal from the third rotation detector 80 (see FIG. 4).

Then, a proper engine rotational speed is selected from either one or both of the first and second target engine rotational speeds and is set to the optimum target engine rotational speed at 204.

In the disclosed embodiments, the optimum target engine rotational speed is determined in the following manner. The second target engine rotational speed is selected as a lower limit value. The MAX value illustrated in FIG. 4, which MAX value depends on vehicle velocity, is used as an upper limit value.

If the first target engine rotational speed lies between the upper and lower limit values, then the first target engine rotational speed is selected as the optimum target engine rotational speed.

If the first target engine rotational speed is equal to or larger than the upper limit (MAX) value, then the upper limit value is selected as the optimum target engine rotational speed.

If the first target engine rotational speed is equal to or smaller than the lower limit value, then the lower limit value (i.e. the second target engine rotational speed) is selected as the optimum target engine rotational speed.

A primary delay constant (i.e. low pass filter constant) corresponding to the shift position and the position of the optional switch 84 is then applied to the optimum target engine rotational speed at 206, thereby determining the final target engine rotational speed. In response to the shift position and the optional switch 84, the primary delay constant defines the time which is required for the final target engine rotational speed to reach the optimum target engine rotational speed. The primary delay constant is set so that this arrival time is longest when in the D shift position.

Figure 10:
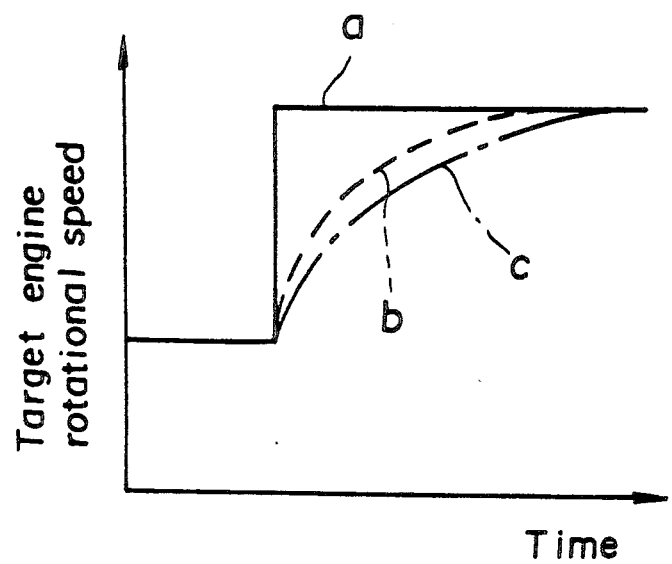
FIG. 10 is a timing diagram which illustrates a low pass filtering operation of the present invention.

FIG. 10 illustrates the operation of the primary delay (or low pass filter) block 206, the optimum target engine rotational speed (which is the filter input) being designated "a", and possible outputs of the filter 206 (final target engine rotational speeds) being designated "b" and "c". FIG. 10 also illustrates the effect of the optional switch 84 on the filter operation. For example, if the shift position is D and the optional switch 84 is OFF, then the filter output is c. If the shift position is D and the optional switch 84 is ON, then the filter output is b. Thus, in this example, the optional switch 84 has the effect of reducing the delay associated with the filter. This is because the optional switch 84, as further discussed below, causes the system operation in the selected shift position to be based at least in part on the operation associated with the next lower shift position. Thus, when optional switch 84 is ON, the delay is reduced to reflect the fact that the delay for $L_2$ (the next lower shift position) is less than the delay for D (the D delay being longest).

In the D shift position, the first and second target engine rotational speeds are set on the basis of a predetermined proportional distribution ratio which acts on the first tables 200D and $200L_2$ and the second tables 202D and $202L_2$ when the control unit 82 receives an ON signal from the optional switch 84. That is, when the optional switch 84 is ON, the engine rotational speed is based in part on the table associated with the low gear side of the present shift position (e.g. one shift position lower). FIG. 3 graphically illustrates the first target engine rotational speed values of the D, L2 and L1 tables versus throttle opening degree. For example, if the shift position is D and the optional switch 84 is ON, then the proportional distribution ratio applied by the control unit 82 causes the first target engine rotational speed to be set between the D and L2 table values, as illustrated by the lower broken line in FIG. 3. In this example, the broken line value is approximately half-way between the D and L2 values, roughly corresponding to a 50% proportional distribution ratio. The second target engine rotational speed is also determined in this manner when the optional switch 84 is ON (see broken lines in FIG. 4).

Due to this, the operating performance and the economical performance can be freely selected in accordance with the shift position (D, $L_2$, or $L_1$) and the ON/OFF operation signal of the optional switch 84. Accelerating performance and engine braking effect can be efficiently effected The desired operating characteristics (speed change characteristics) can be produced. It is practically advantageous.

On the other hand, since the control response speed can be changed by the vehicle velocity detection signal in accordance with the shift position, a wide selection of various characteristics such as sporty performance, silent performance, economical performance, etc. can be provided in accordance with the shift position. It is possible to meet the driver's desired operating characteristics. The use efficiency can be improved.

FIGS. 6 to 9 show a second embodiment of the invention. In the second embodiment, the portions having the same functions as those in the foregoing first embodiment are designated by the same reference numerals.

Figure 7:
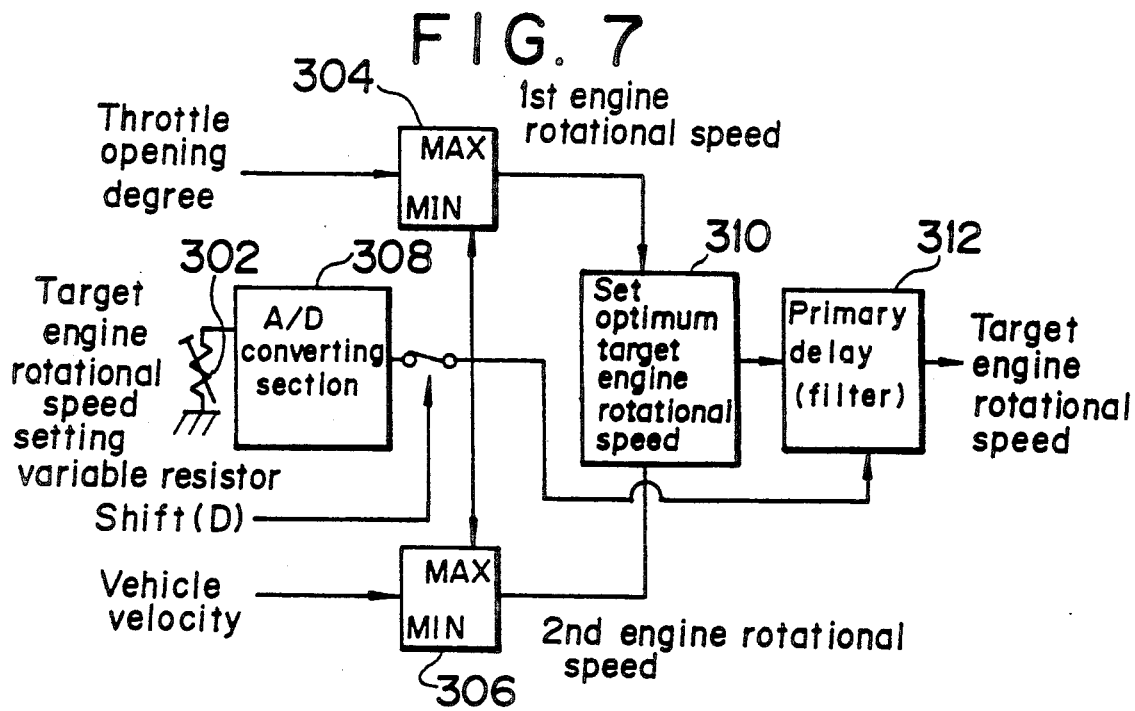
FIG. 7 is a diagram for explaining how the second embodiment achieves engine rotation control of the belt drive type continuous variable transmission.

It is a feature of the second embodiment that a predetermined condition to obtain the final target engine rotational speed is represented by an arbitrary set signal from a variable resistor 302 (FIG. 7).

Figure 8:
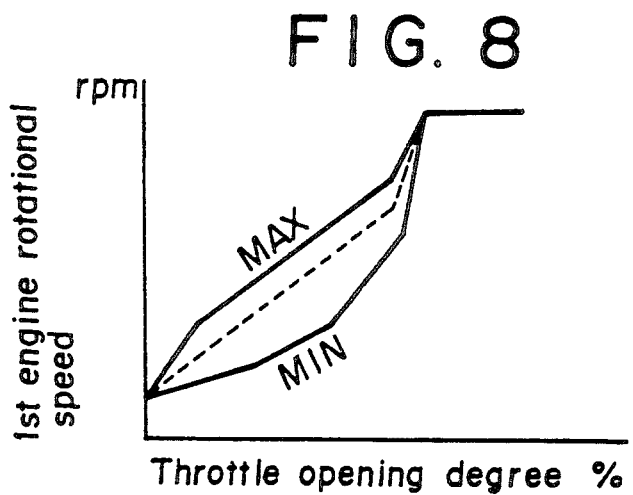
FIG. 8 is a diagram showing the relation between a first engine rotational speed and the throttle opening degree in the second embodiment.
Figure 9:
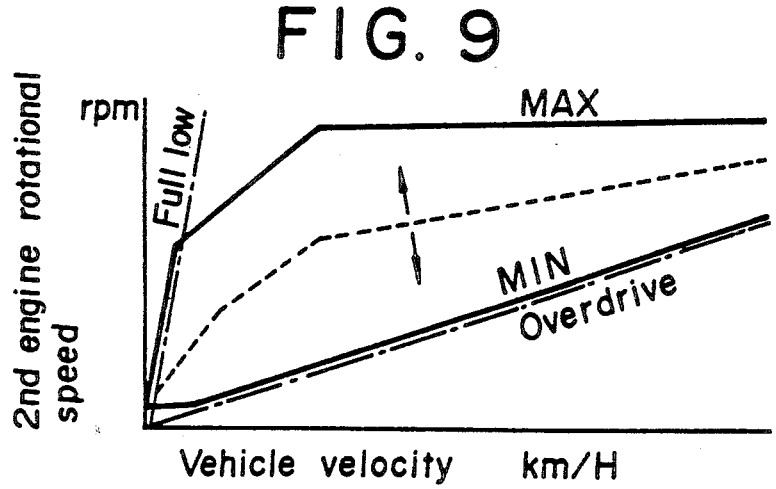
FIG. 9 is a diagram showing the relation between a second engine speed and the vehicle velocity in the second embodiment.

That is, as shown in FIG. 7, the first target engine rotational speed is obtained from a first table 304 on the basis of the detection signal of the throttle opening degree (θ) of the carburetor (not shown) and the arbitrary set signal from the variable resistor 302 (see FIG. 8). The second target engine rotational speed is obtained from a second table 306 on the basis of the vehicle velocity detection signal from the third rotation detector 80 and the arbitrary set signal from the variable resistor 302 (see FIG. 9).

A voltage level (the voltage across the variable resistor 302) of a target engine rotational speed which is arbitrarily set is converted by an A/D converting section 308. After that, the variable resistor 302 fetches the arbitrary set signal when the shift position is set to D and uses as a set signal. That is, the output of the A/D converting section 308 is applied to the tables 304 and 306 and the delay section 312 by a switch 314 which closes in response to shift position D.

Based on the A/D output and the throttle opening degree, the first target engine rotational speed is determined from table 304. The second target engine rotational speed is determined based on the A/D output and the vehicle velocity. Hence, by using the variable set signal from the variable resistor 302, additional flexibility is provided, as opposed to using a single voltage level to represent the D shift position.

Then, as discussed above, the proper engine rotational speed is selected from either one of or both of the first and second target engine rotational speeds and is set to the optimum target engine rotational speed at 310. After that, the primary delay constant, which can be selectively varied based on the arbitrary set signal from the variable resistor 302, is applied to the optimum target engine rotational speed at 312, thereby deciding the final target engine rotational speed.

Figure 6:
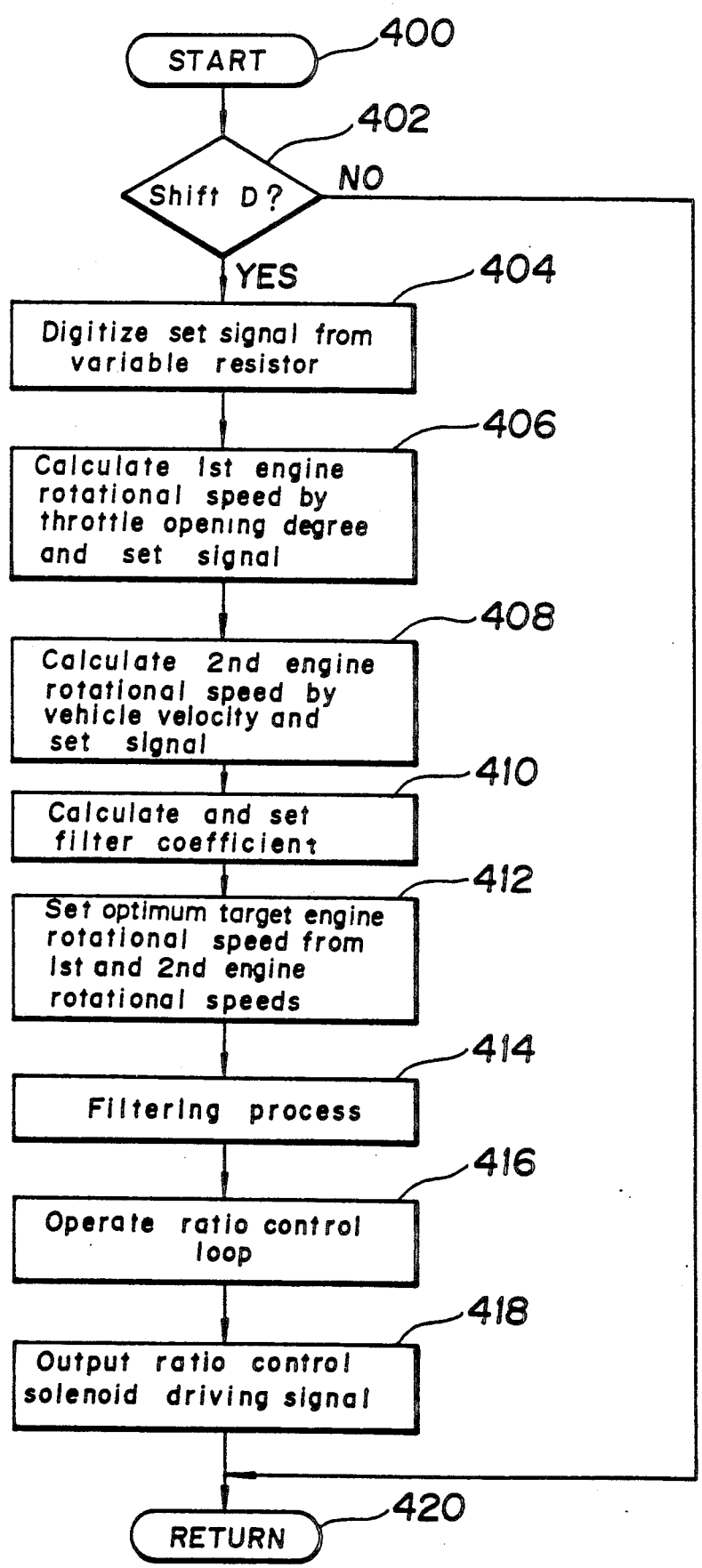
FIG. 6 is a flowchart for showing how a second embodiment of the invention controls engine rotation of a belt drive type continuous variable transmission.

Explanation of the second embodiment will now be made with reference to the flowchart in FIG. 6.

The program for the engine rotation control of the belt drive type continuous variable transmission 2 is started at 400 by the actuation of the internal combustion engine. A check is made at 402 to see if the shift position has been set to D.

If the discrimination 402 is YES, the set signal from the variable resistor 302 is digitized at 404. If NO in step 402, the program ends at 420.

After the process 404, the first engine rotational speed is calculated at 406 from the throttle opening degree and the set signal. The second engine rotational speed is calculated at 408 from the vehicle velocity and the set signal.

Next, a filter coefficient is calculated and set at 410. The optimum target engine rotational speed is set at 412 from the first and second engine rotational speeds.

Further a delay filtering process 414 is executed and the final target engine rotational speed is thereby obtained. After that, a ratio control loop operating process 416 is performed based on the final target engine rotational speed. A ratio control solenoid driving signal is output at 418. The engine rotation of the belt drive type continuous variable transmission 2 is controlled and the program ends at 420.

Thus, driving performance and economical performance can be freely selected in accordance with the arbitrary set signal of the variable resistor 302 in a manner similar to the first embodiment. Acceleration and engine braking can be efficiently effected. The desired operating characteristics (speed change characteristics) can be produced, which is practically advantageous.

On the other hand, the control response speed can be changed in accordance with the shift position by the vehicle velocity detection signal and the arbitrary set signal of the variable resistor 302. Therefore, a wide selection of various characteristics such as sporty performance, silent performance, economical performance, etc. can be provided in accordance with the shift position. It is thus possible to meet the operating characteristics desired by the driver, and efficiency can be improved.

The present invention is not limited to the first and second embodiments mentioned above but many variations and modifications are possible.

For instance, in the first embodiment of the invention, the detection signal of the shift lever position and the ON/OFF signal from the optional switch are used as predetermined conditions for effecting speed control. In the second embodiment, the arbitrary set signal from the variable resistor is used as a predetermined condition. However, the multi-stage of the shift, an optional switch having multiple contacts, or an A/D processing section for converting multiple voltages by using a rudder resistor (voltage divider) may be used to provide predetermined conditions for speed control. The upper and lower limit values of the optimum target engine rotational speeds would then be set by the control unit in accordance with those predetermined conditions.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for controlling a continuous variable transmission of a vehicle, including a fixed pulley member and a movable pulley member which is supported relative to the fixed pulley member so as to be movable toward and away from the fixed pulley member, a groove defined between the pulley members having a width which is decreased and increased to thereby increase and decrease a rotational radius of a belt which is reeved between both of the pulley members in said groove, and a control means for executing speed change control so as to change the belt ratio to a selected value, the improvement wherein said control means comprises a control unit having means for receiving a throttle opening degree detection signal and vehicle velocity detection signal, means for determining a first target engine rotational speed based on the throttle opening degree detection signal and the selected belt ratio, means for determining a second target engine rotational speed based on the vehicle velocity detection signal and the selected belt ratio, at least one of said target engine rotation speed determining means including speed setting means for setting the associated target engine rotational speed to a first speed value in response to a first belt ratio being selected and to a second speed value which is different from said first speed value in response to a second belt ratio being selected, said speed setting means including proportional distribution means for selectively setting the associated target engine rotational speed to a third speed value between said first and second speed values even though one of said first and second belt ratios is selected, means for determining an optimum target engine rotational speed from said first and second target engine rotational speeds, means for setting upper and lower limit values of the optimum target engine rotational speed in accordance with predetermined conditions, and means for obtaining a final target engine rotational speed from said optimum target engine rotational speed, whereby the speed change control is executed so as to assure desired operating characteristics adapted to the running state of the vehicle.

2. A method of controlling a continuously variable vehicle transmission which includes a pair of adjustable pulleys, a belt wrapped around the pulleys, and means for adjusting the pulleys to achieve a selected belt ratio, comprising the steps of:

setting a target engine speed to a first value in response to a first belt ratio being selected, setting the target engine speed to a second value different from said first value in response to a second belt ratio being selected, and selectively setting the target engine speed to a third value between said first and second values even though one of said first and second belt ratios is selected.

3. A method according to claim 2, wherein said steps of setting said target engine speed each include the steps of detecting a carburetor throttle opening degree of the vehicle and determining said target engine speed based on both the detected throttle opening degree and said selected belt ratio.

4. A method according to claim 2, wherein said steps of setting said target engine speed each include the steps of detecting the vehicle velocity and determining said target engine speed based on both the vehicle velocity and the selected belt ratio.

5. A method according to claim 4, including the further steps of setting a further target engine speed to a first value in response to a first belt ratio being selected, setting said further target engine speed to a second value different from said first value in response to a second belt ratio being selected, and selectively setting said further target engine speed to a third value between said first and second values even though one of said first and second belt ratios is selected.

6. A method according to claim 5, wherein said steps of setting said further target engine speed each include the steps of detecting a carburetor throttle opening degree of the vehicle and determining said further target engine speed based on both said detected throttle opening degree and said selected belt ratio.

7. A method according to claim 6, including the further steps of using one of said target engine speeds to define a speed range;

determining an optimum engine speed within said speed range on the basis of said target engine speeds; and adjusting said belt ratio as a function of said optimum engine speed.

8. A method according to claim 7, wherein the step of adjusting said belt ratio as a function of said optimum engine speed includes the step of determining a final engine speed which changes at a selected rate of change in response to changes in said optimum engine speed, and adjusting said belt ring as a function of said final engine speed.

9. A method according to claim 8, including the steps of setting said rate of change to a first value in response to a first belt ratio being selected, setting said rate of change to a second value different from said first value in response to a second belt ratio being selected, and selectively setting said rate of change to a third value between said first and second values even though one of said first and second belt ratios is selected.

* * * * *

UNITED STATES PATENT AND TRADEMARK OFFICE
CERTIFICATE OF CORRECTION

PATENT NO. : 5 114 383

DATED : May 19, 1992

INVENTOR(S) : Sadayuki Hirano et al

It is certified that error appears in the above-identified patent and that said Letters Patent is hereby corrected as shown below:

Column 12, line 27; change "ring" to ---ratio---.

Signed and Sealed this

Twenty-first Day of September, 1993

Attest:

BRUCE LEHMAN

Attesting Officer     Commissioner of Patents and Trademarks